Figure 1:
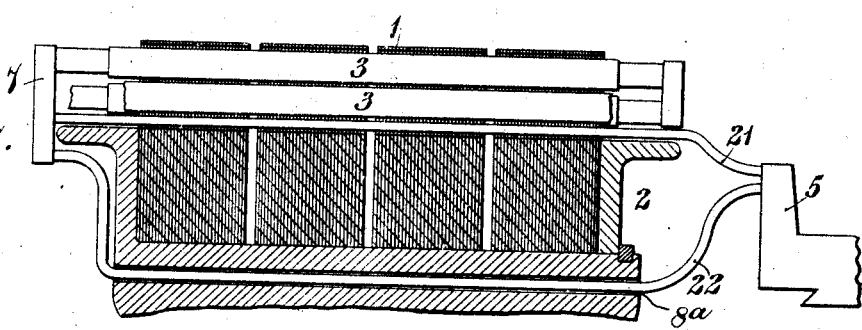

No. 885,163. PATENTED APR. 21, 1908.
B. G. LAMME.
ARMATURE WINDING FOR HIGH SPEED DYNAMO ELECTRIC MACHINES.
APPLICATION FILED JUNE 2, 1905.

WITNESSES:
C. L. Belcher
Otto S. Schairer

INVENTOR
Benj. G. Lamme
BY
Wiley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ARMATURE-WINDING FOR HIGH-SPEED DYNAMO-ELECTRIC MACHINES.

No. 885,163.  Specification of Letters Patent.  Patented April 21, 1908.

Application filed June 2, 1905. Serial No. 263,479.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Armature-Windings for High-Speed Dynamo-Electric Machines, of which the following is a specification.

My invention relates to armature windings for dynamo-electric machines, and it has for its object to provide an improved form and arrangement of such windings for special use with machines that are adapted for high speeds of rotation.

In the construction of large direct current generators of the usual form and for ordinary voltages, the armatures are usually provided with parallel-circuit windings having but a single turn per coil or per commutator bar. The number of field magnet poles and, consequently, the number of parallel armature circuits is generally determined by the amount of current that may be successfully commutated and that may be carried by armature conductors of practical proportions; *i. e.*, the number of pairs of field magnet poles and the number of parallel armature circuits are varied in proportion to the current capacity of the machine.

It is a comparatively simple problem to construct machines for operation at slow speeds in which the current per armature circuit and the numbers of poles and commutator segments are not extraordinary without adopting abnormal proportions for the machine as a whole, but when it is desired to operate at higher speeds than have been usual, such, for instance, as may be obtained by the use of steam turbines as prime movers, great difficulties in design and construction are immediately encountered. The maximum safe peripheral speeds of the armature and commutator limit and determine the diameters of these parts and the maximum number of commutator segments, if the minimum practical width of a segment has been fixed, is dependent upon the diameter of that member. The number of field magnet poles is dependent upon the maximum number of commutator segments, if a given number of segments per pole is deemed necessary in order that the voltage between adjacent segments may not be excessive, and it is also dependent upon the available circumferential space and the desired widths of the pole pieces and interpolar spaces, the provision of a wide commutating field being of considerable advantage in operation.

In the consideration of specific problems of high speed operation, it will generally be found that the number of poles and, consequently, the number of parallel circuits and armature conductors must be smaller, with a corresponding increase in the size and current-carrying capacity of the conductors, than has been considered allowable for low speed machines. Since the number of poles cannot be conveniently increased to what would ordinarily be employed in corresponding low speed machines, it is evidently desirable that the same benefits or the equivalent of the benefits that may be derived from an increase in the number of poles shall be embodied in high speed machines, and it is the object of my invention to provide a machine which shall embody such improvements.

In a drum-wound armature, adjacent commutator bars are connected to opposite ends of the armature coils, and in case there is but one turn per coil, the direction of the electromotive force in a complete turn must be reversed when the two commutator segments are connected by a brush. The rear end of each coil is at a potential that is neutral to the two commutator bars to which the front ends of the coil are connected. If commutator segments are provided intermediate the segments to which the ends of the coils are connected and these intermediate segments are connected to the rear ends of the coils in such manner that no electromotive force may be generated in the connecting conductors, then the differences of potential between adjacent segments will be half of that which formerly existed, or the electromotive force generated in one-half of a turn or in a single armature conductor. In this manner, a machine adapted to a high speed of rotation may be designed which has a small number of poles and a small number of conductors in proportion to the voltage desired, and the number of commutator bars may be twice as great as the number of turns in the armature; that is, the total number of commutator bars may be equal to the total number of conductors on the armature.

Figure 2:
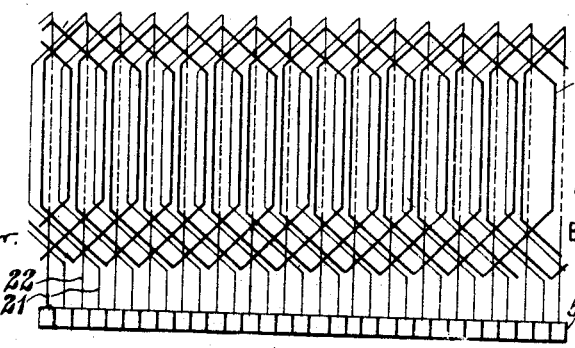

In the accompanying drawing, Figure 1 is a longitudinal, sectional view of a portion of an armature of a dynamo-electric machine provided with a winding constructed in accordance with my invention, and Fig. 2 is a diagrammatic view of part of an armature winding of the form shown in Fig. 1.

The magnetizable core 1 of an armature 2 is provided with a winding comprising a plurality of coils 3, their ends, which are remote from the commutator segments 5, being connected to alternate segments by comparatively high-resistance conductors 21 which are located in the same slots as the armature conductors. Comparatively low resistance conductors 22 connect the remaining commutator segments to the same points in the armature coils as the conductors 21, but they are located in apertures 8ª in the armature spider, or they may be otherwise located outside of the armature core structure, and the magnetic field of the machine. With this arrangement, when an armature conductor is moving in a magnetic field, the connection or lead which lies in the commutator slot will generate an electromotive force corresponding to half a turn, while the conductor located outside of the magnetizable core will generate little or no electromotive force and consequently the electromotive force between adjacent commutator segments will be approximately equal to the voltage generated in a single armature conductor.

From a consideration of the description and drawings, it will be understood that I provide an equivalent of a large number of magnetic poles by decreasing the number of armature conductors in series and, consequently, the voltage between commutator segments.

The structural details and the arrangements of the armature conductors and connections thereof with the commutator segments may be varied considerably from what has been here specifically shown and described without departing from the spirit of my invention.

I claim as my invention:

1. The combination with a slotted armature core and a commutator cylinder, of a winding comprising a plurality of coils located in the armature slots, conductors located in the armature slots for connecting the terminals of the coils with alternate commutator segments, and other conductors located outside of the armature core for connecting the terminals of the coils with the remaining commutator segments.

2. The combination with a slotted armature core and a commutator cylinder, of a winding comprising a plurality of coils located in the armature slots, the ends of the coils remote from the commutator cylinder being connected to alternate commutator segments by means of conductors located in the armature slots and also by means of conductors located outside of the magnetizable portion of the armature core.

3. The combination with a slotted armature core and a commutator cylinder, of a winding comprising a plurality of coils located in the armature slots, the ends of the coils remote from the commutator cylinder being connected to commutator segments by means of comparatively high resistance conductors located in the armature slots and by comparatively low resistance conductors located outside of the magnetizable portion of the armature core.

In testimony whereof, I have hereunto subscribed my name this 31st day of May 1905.

BENJ. G. LAMME.

Witnesses:
ELIZABETH LIVINGSTONE,
BIRNEY HINES.